United States Patent [19]

deVries

[11] 4,284,609

[45] * Aug. 18, 1981

[54] CONDENSATION CLEANING OF PARTICULATE LADEN GASES

[75] Inventor: Egbert deVries, Kettering, Ohio

[73] Assignee: Quad Environmental Technologies Corp., Highland Park, Ill.

[*] Notice: The portion of the term of this patent subsequent to Feb. 27, 1996, has been disclaimed.

[21] Appl. No.: 6,015

[22] Filed: Jan. 24, 1979

Related U.S. Application Data

[63] Continuation-in-part of Ser. No. 814,420, Jul. 11, 1977, Pat. No. 4,141,702.

[51] Int. Cl.³ .................... C01B 17/00; B01D 47/00; B01D 45/00; C01B 17/16
[52] U.S. Cl. .................... 423/242; 423/210; 423/215.5; 423/220; 423/235; 423/240; 423/246; 55/73; 55/80; 55/94; 55/257 HE; 75/25; 426/466; 426/472
[58] Field of Search ............... 55/80, 94, 257 HE, 73; 423/242 A, 242 R, 244 A, 244 R, 215.5, 240, 210, 220, 235, 246; 75/25; 426/466, 472

[56] References Cited

U.S. PATENT DOCUMENTS

| | | | |
|---|---|---|---|
| 1,844,851 | 2/1932 | Harmon | 55/90 X |
| 3,473,298 | 10/1969 | Borman | 55/257 HE |
| 4,102,982 | 7/1978 | Weir | 423/242 |
| 4,141,702 | 2/1979 | deVries | 55/94 |

*Primary Examiner*—O. R. Vertiz
*Assistant Examiner*—Gregory A. Heller
*Attorney, Agent, or Firm*—Fidelman, Wolffe & Waldron

[57] ABSTRACT

Particulate laden gas, especially those gases carrying particulates having a size in the micron or submicron range, are removed by humidifying the gas with water and thereafter subjecting the gas to indirect contact heat exchange sufficient to provide an energy transfer for water vapor condensation of at least 5 horsepower per 1000 cfm. Heat exchange is accomlished by passing the gas downwardly through an exchange element having smooth and vertical gas passages of a relatively large dimension.

24 Claims, 4 Drawing Figures

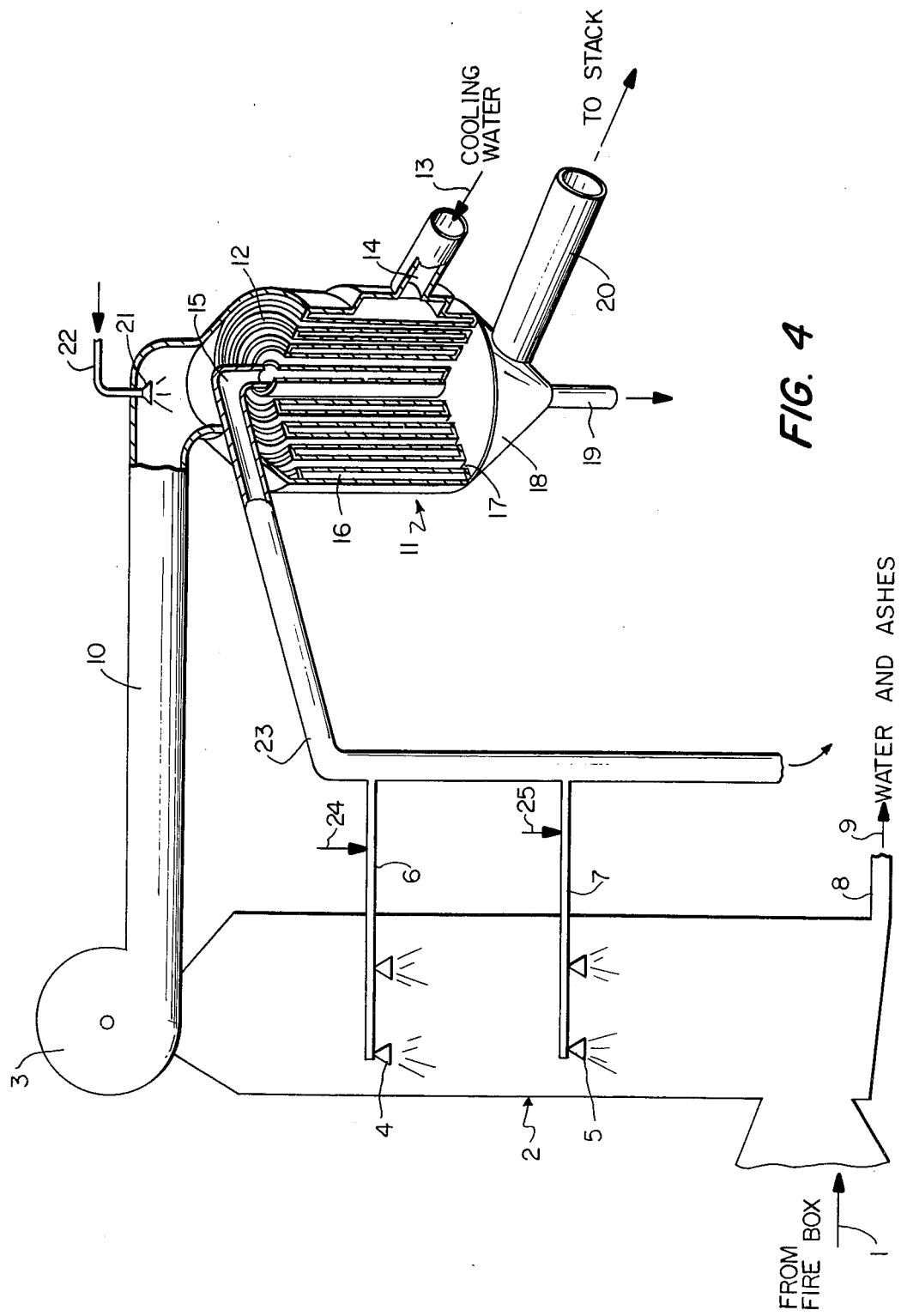

CONDENSATION CLEANING OF PARTICULATE LADEN GASES

CROSS REFERENCES TO RELATED APPLICATIONS

This application is a continuation-in-part of application Ser. No. 814,420 filed July 11, 1977 for Condensation Cleaning of Exhaust Gases, now U.S. Pat. No. 4,141,702.

BACKGROUND OF THE INVENTION

This invention relates to the removal of particulate material from gas streams. More specifically, this invention relates to the removal of particulates having a particle size in the micron and submicron range from relatively hot gas streams.

Particulate laden gas streams are produced by a large variety of industrial processes. Depending upon the source, temperature of such gas streams can range from ambient to combustion temperatures. Exhaust gases from combustion processes represent probably the most common examples of such particulate carrying gas streams. Other troublesome gas streams include emissions from cupola furnaces, exhaust streams from cement kilns, coke oven off-gas and quench gas, exhaust gases from coffee roasting and grain drying and other similar processes.

In addition to carrying particulate matter, most of these waste gas streams are also at moderately elevated to very high temperatures. It is standard to remove particulates from such gases by a variety of techiques including electrostatic precipitation, filtration such as in bag houses, and by the use of a variety of wet-scrubbing techniques. Wet scrubbers generally find use where cooling of the gas stream is desired, where moisture addition is not objectionable and where the problem of disposing or further treating the scrubbing liquid polluted with the materials removed from the gas can be handled. Publications describing the uses, design and performance of wet scrubbers are:

Calvert, Seymour, How to Choose a Particulate Scrubber, *CHEMICAL ENGINEERING*, pp. 54-68, Aug. 29, 1977.

Semrau, Konrad, Practical Process Design of Particulate Scrubbers, *CHEMICAL ENGINEERING*, pp. 87-91, Sept. 26, 1977.

Calvert, Seymour, Upgrading Existing Particulate Scrubbers, *CHEMICAL ENGINEERING*, pp. 133-140, Oct. 24, 1977.

Gilbert, William, Trouble Shooting Wet Scrubbers, *CHEMICAL ENGINEERING*, pp. 140-144, Oct. 24, 1977.

As is set out in those publications, the ultimate efficiency of a wet scrubber is a direct function of the total energy loss in turbulence per unit volume of gas treated by the scrubber. In theory at least, any scrubbing device regardless of its design will achieve the same degree of particulate removal if it is operated at the same total turbulence per unit volume of gas. Energy to create turbulence for gas-liquid contacting can be supplied in three ways. It may be extracted from the energy of the gas stream, from the energy of the liquid stream, or from mechanical agitation of the two streams. Of course any combination of these three types of energy input may be utilized but the result is the same.

Wet scrubbers are often characterized as being either of low-energy or high-energy types. While there is no clear line of distinction between the two, a low-energy scrubber is generally characterized as having a power input in the range of about 0.75 to about 3 hp per 1000 cfm and a high-energy scrubber is considered to be one having a power input of about 3 to 6 hp per 1000 cfm. There is a practical limit as to the total energy which can be supplied for gas-liquid contacting because of the problems involved in efficiently coupling an energy source to the fluid streams.

It has long been recognized that the collection efficiency of particulate scrubbers can be increased by operating a scrubber under conditions such that condensation from water vapor from the gas stream occurs during the scrubbing process. Condensation will occur in the scrubber if the water dew point of the gas stream is above the temperature of the scrubbing liquid. Conversely, if evaporation occurs during the scrubbing process, as would be the case wherein the scrubbing water is at a higher temperature than the incoming gas stream, collection efficiency of the scrubber is decreased. Data supporting these observations are contained in a paper by K. T. Semrau and C. L. Witham entitled, "Condensation and Evaporative Effects in Particulate Scrubbing", presented at the Air Pollution Control Association, 68th Annual Meeting, June 15-20, 1975.

SUMMARY OF THE INVENTION

It has been found that energy exchanged by condensation of water through indirect contact heat exchange is equivalent in result for the removal of solid particulates from gas streams to energy introduced into a scrubbing system from an external mechanical source. Gas streams amenable to cleaning by this technique correspond generally to those which are now cleaned by wet scrubbing. A particulate laden gas stream is humidified by means of a water spray or stream, as appropriate, and is thereafter subjected to indirect contact heat exchange sufficient to provide an energy transfer as measured by condensation of water contained in the gas stream of at least 5 hp per 1000 cfm. Heat exchange is accomplished by passing the humidified gas downwardly through an exchange element having smooth and essentially vertical surfaces. Water condensing on the heat exchange surfaces traps and removes particulate matter from the gas stream and, as the condensate flows down the heat exchange element, it continually washes and cleans the heat exchange surfaces.

Hence, it is an object of this invention to remove particulate matter and other contaminants from gas streams.

Another object of this invention is to cool and clean hot, particulate laden industrial waste gas streams.

Yet another object of this invention is to enhance the performance of particulate removal devices.

BRIEF DESCRIPTION OF THE DRAWINGS

FIG. 4 is a diagramatic flow sheet of one embodiment of this invention especially adapted for the cleaning of hot, particulate laden combustion exhaust gases.

DETAILED DESCRIPTION OF THE INVENTION

Figure 1:
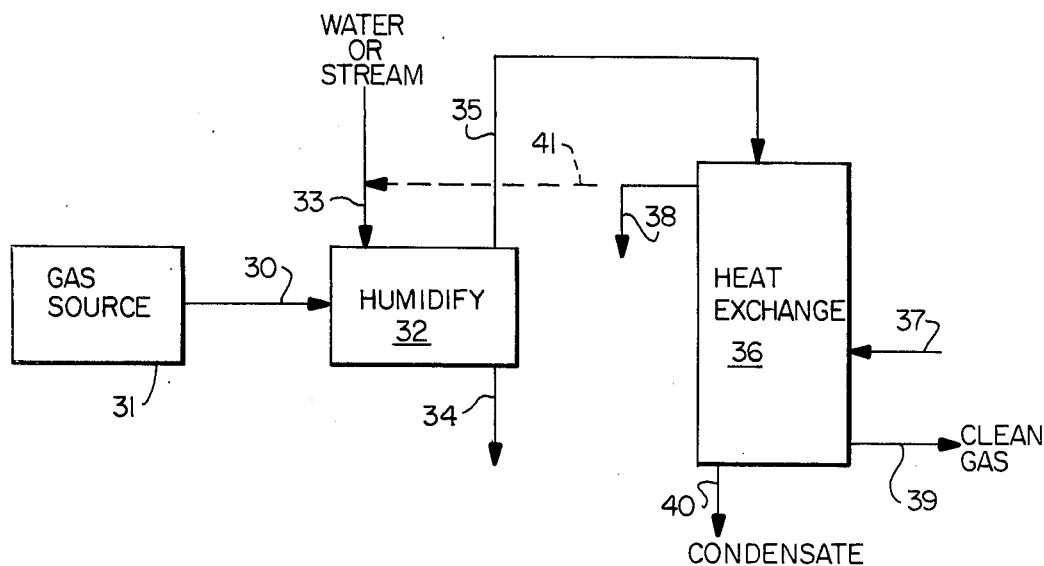
FIG. 1 is a schematic flow sheet of the necessary steps included within this inventive process.

Referring now to FIG. 1, there is shown a schematic outline of the process steps required in this invention. A particulate laden gas stream 30 produced by the operation of source 31 is passed to humidifying zone 32. Within zone 32, the gas stream is contacted with a water spray or mixed with steam depending upon the characteristics of the gas stream. Either water or steam, or in some cases both, is introduced into humidification zone 32 by way of conduit means 33.

For the purposes of this disclosure, particulate carrying gas streams amenable to treatment by this process can be classified into two groups; wet gas streams and dry gas streams. Each of these two gas stream types can be further characterized as being either hot or warm, the latter being arbitrarily defined as ranging in temperature from ambient to about 300° F. Wet gas streams are those which are either saturated or nearly saturated with water vapor. Gas streams of this sort are typically produced by drying processes and by some wet digestion processes. Dry gas streams are those which display a water dew point substantially below the gas temperature.

Humidification zone 32 preferably comprises an open tower or vessel having disposed therein a plurality of spray nozzles arranged to cause intimate contacting of water droplets or steam with the dirty gas steam. In one exemplary embodiment, humidification zone 32 may comprise a vertical scrubbing tower having spray nozzles disposed in an upper portion thereof to direct a water spray downwardly into the tower. In this embodiment, it is preferred that the dirty gas be caused to enter the spray tower near the bottom and pass counter currently to the downwardly directed water spray. If the dirty gas contains relatively large particulates, some cleaning and particulate removal will occur in the humidification zone. Provision must be made for the removal of excess water containing particulates stripped from the gas which collects in the bottom of the spray tower. This may conveniently comprise a water drain 34 disposed at a lower level of the scrubbing tower.

Humidification zone 32 may also comprise a horizontal spray chamber having water spray nozzles disposed along the top. In this case as well, provision must be made for drainage means to remove excess water from the spray zone. In those cases where humidification is accomplished by steam injection, humidification zone 32 may comprise simply a conduit or duct into which is directed one or more steam injection nozzles.

In all cases, the humidified gas stream 35 exiting the zone 32 must have a sufficiently high water vapor content to provide a water dew point substantially above the temperature maintained within the heat exchange zone 36. The temperature differential between the water dew point of the humidified gas and the temperature maintained within the heat exchanger must be sufficient so as to allow an energy transfer as measured by water vapor condensation of at least 5 hp per 1000 cfm. In a practical sense, this requires that the temperature in the heat exchanger be maintained at least 15° F., and preferably more than 25° F., below the dew point of the incoming gas stream.

Heat exchange zone 36 comprises an indirect contact heat exchange element which is cooled by a circulating fluid stream. In most practical embodiments of this invention, the cooling fluid comprises water which is introduced into the heat exchange zone via conduit 37 and removed from the zone by way of conduit 38. As the humidified gas stream passes through heat exchange zone 36, it is cooled to a temperature below its dew point and subjected to additional heat exchange sufficient to condense out on the heat exchange surfaces a substantial amount of the contained water vapor. Particulate matter contained in the gas stream is trapped and removed from the gas stream by the condensing water vapor. A gas stream 39, now cleaned of a substantial portion of its contained particulate matter and being essentially saturated in water vapor, is removed from the heat exchange zone and is passed from the system. A condensate stream 40 loaded with the removed particulate matter drains from the heat exchange zone at a lower portion thereof.

Although accomplishing the same result as wet scrubbers with comparable rates of energy transfer, the primary particle collection mechanisms taking place within the heat exchange zone are significantly different from those occuring in wet scrubbers. In wet scrubbers, particularly high-energy wet scrubbers, the primary collection and removal mechanism is the collision of liquid droplets with the tiny suspended solid particles and their subsequent capture and incorporation within the liquid droplet. It is accepted that wet gas scrubbers will obtain high efficiencies when the particle radius, particle density, and relative velocity between particle and target droplet are high and when gas viscosity and target droplet size are low. For practical engineering design purposes, efficiency of a wet scrubber is a function of the total power dissipated in turbulence in the system regardless of geometry of the particular device used. In contrast to wet scrubbers, the process of this invention does not rely upon turbulence effects to cause particle capture and removal.

It is postulated that the disclosed process operates in the following fashion. First of all, it is believed that a substantial contribution to the efficiency of the disclosed process occurs by the increase in mass of each individual particle by condensation of water on its surface as the humidified gas stream is cooled. This phenomenon is, of course, well known and can occur at least to some extent in conventional wet scrubbers where condensation takes place. Particle means grown by water condensation can be considered a trapping but not a collection mechanism. It is believed that the primary collection mechanisms at work in this process are a combination of thermophoresis or Stefan flow and diffusiophoresis. Both of these phemomena are known in the art but are rarely if ever of significance to the particle collection efficiency of a conventional wet gas scrubber.

Thermophoresis is a collection effect induced by removal of heat from the gas stream. As the heat exchange surfaces are at a lower temperature than that of the gas, there is developed a corresponding temperature gradient between particles carried in the gas stream and the heat exchange surfaces. This temperature differential causes fine particles to be driven toward the colder heat exchange surface by differential molecular bombardment arising from the temperature gradient. Diffusiophoresis is a mass transfer phenomenon driven by the condensation of water vapor contained in the gas stream upon the colder heat exchange surface. This effect exerts a force upon particles which causes them to deposit upon the wetted surfaces. In contrast, wet gas scrubbers relay upon inertial impaction and interception of solid particles by liquid droplets. This effect is recognized as the most important collection mechanism in the usual particle scrubber.

The heat exchange element used within the zone 36 must fulfill certain rigid criteria for it to function in this process. Construction of the element must be such that continuous self-cleaning of the heat exchange surfaces occurs. As the condensate contains a considerable amount of suspended particulate material which was removed from the gas stream, many conventional types of heat exchangers would immediately plug under this service. In order to avoid plugging of the heat exchange element and to maintain a high rate of heat transfer, the heat exchange element necessarily must have smooth and essentially vertical gas passages of relatively large dimension. The humidified, particulate laden gas stream must be passed downwardly through the heat exchanger whereby the gas flow cooperates with gravity to cause the dirty condensate to flow down the heat exchange passages and drip from the bottom thereof. A plenum chamber or separation zone is provided at the bottom of the heat exchange element to allow a separation between the condensate and the gas stream. It is preferred to pass the cooling fluid 37 in counter-current relationship with the gas flow as is well known in the art. When water is used as a heat exchange fluid, it is often advantageous to use a portion 41 of the hot exiting water stream 38 as the humidifying liquid in zone 32. This embodiment is particularly advantageous in those situations where the temperature and the water vapor content of dirty gas stream 30 are both low.

Figure 2:
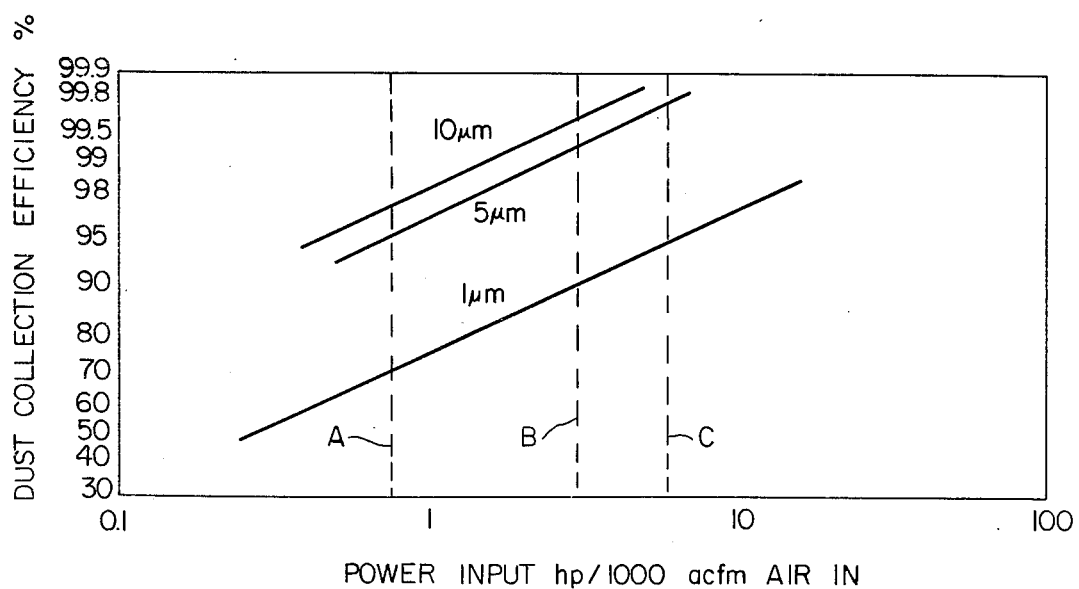
FIG. 2 is a graphical representation showing the relationship of particle removal efficiency as a function of power input to a scrubbing process.

Referring now to FIG. 2, there is shown a plot of dust collection efficiency as a function of power input for a typical wet gas scrubber. This plot is adapted from the Gilbert article, "Trouble Shooting Wet Scrubbers" previously referred to. That area of the plot between vertical lines A and B is the low-energy scrubber region while the plot area between lines B and C represents the limits of performance obtained from typical high-energy scrubbers. At the higher levels of power input, it becomes increasingly difficult to efficiently couple an external power source to either the gas or scrubbing liquid for the purpose of obtaining greater turbulence within the scrubber. In contrast, the process of this invention can obtain much greater power inputs by increasing the water vapor content of the dirty gas stream and thereafter condensing a greater portion of the water vapor in the heat exchange zone.

Figure 3:
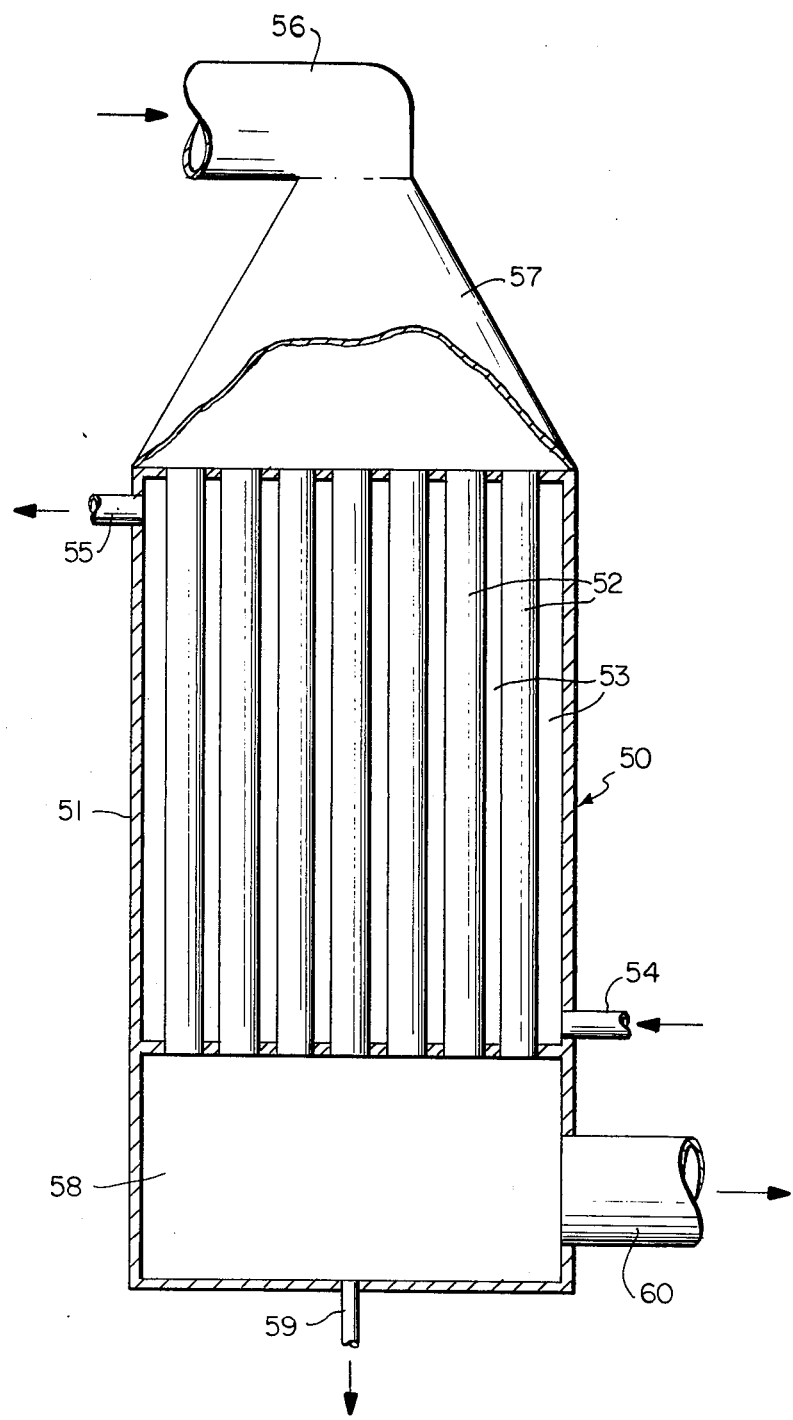
FIG. 3 depicts one exemplary heat exchange element appropriate for use in carrying out the process.

FIG. 3 depicts one heat exchange element specifically adapted for use in this process. It may be characterized generally as a water jacketed, large diameter vertical tube heat exchanger having plenum means in the bottom thereof. Referring now to the drawing, the heat exchanger is generally depicted at 50. Disposed within exchanger shell 51 are a plurality of relatively large diameter, smooth walled, vertical heat exchange tubes 52. The tubes are spaced apart to provide liquid channels 53 which allow a cooling fluid, preferably water, to circulate and to cool the tubes. A cooling water stream 54 is introduced into the heat exchanger, preferably near the bottom thereof, and exits via conduit 55.

A dirty, humidified gas stream is introduced into the top of the heat exchanger by way of duct 56 and is distributed uniformly among the heat exchange tubes by tapered housing 57. Gas passes downwardly through the heat exchange tubes which progressively condense out water vapor contained in the gas while simultaneously trapping and removing particulate matter contained in the gas. Disposed immediately below the heat exchange tubes is a gas-liquid disengaging chamber or plenum 58. Dirty condensate dripping from the bottom of the tubes collect on the plenum floor and is removed by way of conduit 59. A gas stream, now substantially cleaned of its entrained particulate matter, is removed from the plenum by way of duct 60 and may be passed to a stack for release into the atmosphere.

The entering gas stream must contain enough water vapor so that its water dew point is sufficiently above the temperature of the heat exchange elements to provide condensation of water sufficient to provide an energy transfer as measured by water vapor condensation of at least 5 hp per 1000 cfm. In practical engineering terms, this means that the water dew point of the incoming gas must be at a temperature of at least 15° F., and preferably at least 25° F., above the temperature maintained in the heat exchanger. In most practical industrial installations, the water dew point of the incoming gas should be at least 120° F. and preferably more than 150° F.

Diameter of the heat exchange tubes must be sufficient as to preclude any possibility of plugging by buildup of sludge on their inner surfaces. The minimum workable interior diameter of the heat exchange tubes depends upon a number of process variables including particulate loading of the gas stream, amount of water vapor condensed from the gas stream, tube length and gas velocity within the tube. A tube diameter within the range of about 1 to about 5 inches is appropriate for most industrial gas streams while a tube diameter in the range of about 2 to 4 inches will be most generally appropriate. Tube length of course is primarily a function of the heat exchange surface required in order to obtain the necessary degree of water vapor condensation but generally tube length will range from a factor of 10 to a factor of 100 times the diameter.

FIG. 4 illustrates a specific embodiment of the invention used to treat the exhaust gases from an incinerator burning domestic refuse and trash. An exhaust gas stream 1 from the firebox of an incinerator is passed into the base of opened scrubbing tower or spray tower 2. By open tower is meant a tower without packing or other gas-liquid contacting elements. An induced draft fan 3 causes the gases to flow upwardly in the tower. Disposed at varying heights within tower 2 are a plurality of downwardly directed liquid nozzles 4 and 5.

Nozzles 4 and 5 are supplied with water, by means of conduits 6 and 7 respectively. The nozzles produce a relatively coarse water spray which functions to cool the gases and to strip a substantial amount of ash and other coarse particulates from the gas stream. Outlet port 8 is provided at the base of the tower through which an ash-carrying water stream 9 exits and is passed to waste. The water spray also acts to strip some of the water soluble, odorous and noxious gases from the exhaust gas stream.

After passing through the water spray, the exhaust gas stream is essentially saturated, or supersaturated, with respect to water vapor, carries some entrained water droplets and typically has a temperature on the order of 160° F. It has been conventional in the prior art to provide a demister or other entrained water separator immediately downstream of the spray nozzles. In this embodiment, a demister is not only unneeded but is undesirable. Entrained water droplets tend to aid in washing the condensator surfaces, as will later be explained. Additionally, a demister necessarily introduces a positive pressure drop into the system. Thus, elimination of the demister also reduces fan power cost.

From fan 3, the scrubbed exhaust gas is passed via conduit 10 to the top of a heat exchange element which in this embodiment is preferably a spiral flow-cross flow type of heat exchanger 11 which is oriented with the axis of the spiral heat exchange element 12 in a vertical direction. This arrangement provides a continuous spiral gas passage having smooth vertically-oriented wall surfaces which are readily cleaned by condensate flowing downwardly thereon. Cooling water 13 is introduced into the spiral element through entry port 14 and traverses a closed, spiral path to axially disposed exit means 15. Heat exchange element 12, shown in partial cross section, consists of a continuous spiral defining a closed path 16 for water and an open annular flow path 17 for the exhaust gas. This arrangement provides an essentially unobstructed channel-type gas passage which does not foul and plug as do conventional types of heat exchangers, such as shell and tube, used in the same service. Gas pressure drop through the heat exchanger is extremely low and a very high liquid velocity may be maintained in the closed spiral passage.

Exhaust gas from conduit 10 enters the heat exchanger at the top and is directed vertically downward. Contact with the relatively cold heat exchange surfaces causes cooling of the water vapor-saturated gas with concomitant condensation onto those surfaces. As the gas is cooled to temperatures significantly below its dew point, condensation also occurs on the surfaces of solid particles carried by the gas stream thus increasing their apparent mass. Removal of particulate matter takes place during the condensation step as the fine dust and ash particles migrate toward the condensate covered heat exchange surfaces under the influence of thermophoresis and diffusiophoresis forces. Odorous contaminants of relatively high boiling point tend to condensate out with the water and other gaseous contaminants are removed in solution in the condensed water vapor. Condensed water vapor forms a liquid film on the heat exchange surfaces and drains downwardly into a conical sump 18 at the bottom of the heat exchanger. Water carrying trapped particulate matter is removed from the heat exchanger by means of conduit 19 and is passed to waste. Cooled gas cleaned of its entrained particulate matter and reduced in moisture content exits from the bottom side of the heat exchanger via conduit 20 and is passed to a stack. Because of the abrupt change in direction of the gas flow as it leaves the heat exchanger to enter conduit 20, the gas flowing to the stack is essentially free of entrained water droplets.

It is sometimes advantageous or necessary to introduce an additional water spray into the heat exchanger over and above that entrained in the entering gas stream to adequately clean and flush the heat exchange surfaces. Such a condition will generally arise when the entering gas stream is heavily laden with particulate matter. Flushing may be accomplished by providing a spray head 21 centrally located above the heat exchange element. Water may be supplied to the spray head by means of conduit 22. The auxiliary water spray may be operated continuously or may be operated on an intermittent basis to flush the heat exchange surfaces.

Under typical operating conditions, the gas in conduit 10 will be cooled to a temperature below the boiling point of water or to about 150° to 180° F. As the gas passes through the heat exchanger, it is further cooled to a temperature usually within the range of about 110° to 140° F. and is approximately at the dew point as it exits the heat exchanger. Cooling water enters the heat exchanger at a temperature generally in the range of 70° to 90° F. and exits the heat exchanger at a temperature generally in the range of 130° to 150° F. These operating parameters can of course be varied beyond the exemplary ranges set out above.

The relatively hot water stream exiting from the heat exchanger is transported through pipe 23 to points of further use. Part of the hot water stream may be used to supply spray nozzles 4 and 5 via conduits 6 and 7 as is illustrated in the figure. All of the remaining portion of hot water may be used for domestic heating, industrial drying or similar purposes or may be passed through a cooling tower and recycled to the heat exchanger. When maximum recovery of heat from the hot water stream is desired, water may be supplied to spray nozzles 4 and 5 from a external source.

Depending upon the composition of the material being burned in an incinerator, there may be present in the exhaust gas an acid or other noxious gas such as sulphur dioxide. In such circumstances, it is advantageous to add a reactive chemical to the water stream supplied to spray heads or nozzles 4 and 5. This is most conveniently accomplished by introducing a relatively concentrated aqueous solution of the reactive chemical into the conduits supplying the spray heads. As is illustrated in the drawing, a chemical solution may be introduced into conduit 6 at 24 and into conduit 7 at 25. Introduction of the chemical may be accomplished by use of metering pumps as is well known in the art.

Choice of the reactive chemical is dependent upon the gaseous constituent present in the exhaust stream. For example, if sulphur dioxide is present in significant amount, as is the case when rubber or rubber products such as tires are burned, then addition of an alkali such as sodium hydroxide, significantly increases the removal of sulphur dioxide from the exhaust gas. In those cases where the refuse contains substantial amounts of garbage such as food waste, the exhaust gas often carries an offensive odor. Odor removal in the scrubbing tower can be enhanced by addition of an oxidizing chemical to the water supplying the spray nozzles. Suitable oxidizing chemicals include sodium hypochlorite, hydrogen peroxide and the like. Concentration of the oxidizing chemical in the water spray may typically range to about 100 to 300 ppm.

Another specific application of this process is in the cleaning of foundry emissions, particularly emissions from cupola furnaces. The cupola furnace is undoubtedly the major source of foundry air pollution. Cupola emissions are typically on the order of about 1,600° F. and contain a variety of contaminants, including metallic oxides, unburned hydrocarbons, and carbon monoxide. The metallic oxides being primarily in the submicron size range are most difficult to remove.

The traditional cupola pollution control device is the "wet cap" set at the top of the open top cupola. This device comprises a water curtain through which the gases are directed. Some cooling of the gas occurs and many of the larger particles are removed but the resultant discharge remains quite dense even though it is usually of a lighter color. Meeting the present emission control standards requires a much more elaborate system. One approach taken in the prior art has been to cool the gas using water sprays and thereafter remove the particulate matter by filtration in a bag house. This approach requires elaborate safeguards in order to maintain the temperature of the quenched gas below that which would cause damage to the filter fabric yet, at the same time, maintain the gas temperature above its water dew point. If condensation occurs within the bag house, the filter media will immediately plug. Other elaborate approaches to the treatment of cupola emissions involve the use of high-energy wet scrubbers such as those of the venturi or flooded disk type.

In the application of this process to the treatment of cupola emissions, the dirty gas stream is subjected to a water spray of sufficient intensity and duration to cool it to a temperature preferably at or below the boiling point of water. Because of the high temperature of the cupola emission gas, the humidified gas stream will be essentially saturated or supersaturated in water vapor at temperatures in the range of 200°–250° F. The humidified emissions gas, now considerably reduced in volume because of cooling, is passed downwardly through a heat exchange zone as previously described. Because of the extremely small particle size of the metallic oxides contained in the cupola emissions, it is preferred that the energy exchanged by condensation of water vapor be at least 10 hp per 1000 cfm and preferably in the range of 10 to 50 hp per 1000 cfm. At the higher energy transfer rates, substantially all of even the smallest metallic oxide particles are removed from the gas stream.

A similar application of this process is in the cleaning of steel industry waste gases. Examples include coke oven gas, coke quench gas and BOF or open hearth furnace gas. Treatment of these gas streams can be accomplished in a fashion similar to that described for cupola emission gases as these gas streams are typically at a very high temperature and contain a high loading of very small particulate matter.

Another area of application for the described process is in the treatment of gas streams produced in the food industries. Examples include the cleaning of gases from coffee roasting operations, from grain drying and from the spray drying of milk and similar products. Emissions from a coffee roasting operation, in addition to being relatively hot, carry a substantial amount of finely divided chaff and contain fumes and odors of such intensity as to be quite unpleasant. Many of the fumes and odor producing compounds are soluble in water and are at least partially removed in the humidification and condensation steps of the process. Additional odor removal may be obtained by the incorporation of a reactive chemical such as sodium hypochlorite in the water spray used for humidification.

Grain drying presents a very difficult problem of emission control. In addition to relatively large pieces of chaff and dust, the exhaust stream from a grain drying operation, even after conventional gas cleaning, contains what is called "blue smoke" which is characteristic of very finely divided particles in a gas suspension. Depending upon the operating conditions of the grain dryer, it may be necessary to inject steam instead of or in addition to subjecting the gas to a water spray. Otherwise, the process is carried out as previously described.

The spray drying of milk and similar food stuffs produces an exhaust gas which may be essentially saturated in water vapor and at a relatively low temperature on the order of 200° F. In such cases, the humidification step may be considered to be co extensive with the gas production and a separate humidification step may, in some instances, be eliminated from the process. The spray dryer exhaust gas also contains tiny particles of the foodstuff being dried. Were a typical wet scrubber to be used to clean these gases, there results a suspension or solution of the foodstuff in a scrubbing water so diluted as to preclude recovery of the contained food matter. When using the process of this invention, however, the entrained food particles are recovered in the much smaller volume of condensate in a solution concentrated enough to make recovery practicable. In some cases, the recovery of othewise wasted food products is of sufficient value to justify installation of the disclosed process on that basis alone.

Yet another important area of use for the disclosed process is in the treatment of flue gases from coal fired boilers. Such gas streams present special problems as they are relatively dry and typically are at a relatively low temperature. Such flue gases typically have a temperature in the range of about 260° to about 285° F. and display a water content in the range of about 6–8%. Such gases will display a water dew point in the range of about 100° to about 120° F., thus effectively precluding humidification of the gas stream using a water spray without also unduly cooling the gas. In installations of this sort, the heat exchange element would ordinarily be operated at normal cooling water temperatures or at about 70°–100° F.

It is ordinarily necessary in the treatment of flue gases either to operate the boiler at conditions which will increase the flue gas temperature or to use a steam injection along with or in place of the water spray. Depending upon the circumstances of a particular installation, a combination of these approaches can be taken. In addition, it is often possible to take advantage of otherwise wasted heat sources in the humidification step. For example, steam from boiler blow-down may be directed to the humidification zone rather than being vented as is ordinarily done.

This process offers substantial additional advantages in the treatment of those flue gases which contain sulphur dioxide in a concentration requiring wet scrubbing. Because of the very large gas-liquid interface inherent in this process, it also functions very effectively as a chemical mass transfer device. Advantage can be taken of this dual function by introducing any of the known sulphur dioxide-reactive chemicals or compounds into either the humidification zone, the heat exchange zone or both. Particularly effective sulphur dioxide removal is obtained when a base such as sodium hydroxide, sodium carbonate, milk of lime, ammonium hydroxide or other reactive chemical is present during the humidification and condensation steps.

Although the invention was described in relation to the cleaning of specific exemplary gas streams, its use is not limited thereto. Rather, the process is useful in the treatment of essentially all gas streams for the removal of particulates therefrom for which wet scrubbing is feasible.

What is claimed:

1. A method for removing finely divided particulate matter and other contaminants from gas streams selected from the group consisting of furnace emissions, steel industry waste gases, food industry waste gases and combustion flue gases which comprises:

humidifying the gas stream with water;

subjecting the humidified gas stream to indirect contact heat exchange sufficient to lower the gas stream to a temperature below its dew point, thereby condensing water on the surfaces of said particulate matter, and to provide an energy transfer for condensation of water vapor in said gas stream of at least 5 hp per 1000 cfm, said heat exchange being accomplished by passing said humidified gas stream directly to and downwardly through a heat exchange element having smooth and essentially vertical gas passages of relatively large dimension thereby causing migration of said particulate matter from the gas stream to the surfaces of said heat exchange element;

separating condensed water, now containing particulate matter, from the gas stream, and recovering a gas stream substantially depleted of particulate matter.

2. The method of claim 1 wherein the gas stream is humidified by subjecting it to a water spray.

3. The method of claim 2 wherein water is used to cool said heat exchange element and wherein at least a portion of the water exiting the heat exchange element is supplied to the water spray to humidify said gas stream.

4. The method of claim 1 wherein the water to humidify the gas stream comprises steam.

5. The method of claim 1 wherein said heat exchange element comprises a single, closed, spiral liquid passage and an open, annular gas passage, said liquid and gas passages having vertically oriented and parallel boundaries.

6. The method of claim 1 wherein said heat exchange element comprises a plurality of vertically oriented tubes disposed within a shell and arranged for gas flow within the tubes and water flow around the tubes.

7. The method of claim 6 wherein said tubes have a diameter in the range of 1 to 5 inches and a length between 10 and 100 times the diameter.

8. The method of claim 1 wherein said gas stream comprises the emissions from a cupola furnace.

9. The method of claim 8 wherein said cupola furnace emissions gas stream is also cooled during the humidification step to a temperature below the boiling point of water.

10. The method of claim 9 wherein the energy exchanged by condensation of water vapor is in the range of 10 to 50 hp per 1000 cfm.

11. The method of claim 1 wherein said gas stream is a steel industry waste gas.

12. The method of claim 1 wherein said gas stream is a coffee roasting exhaust.

13. The method of claim 1 wherein said gas stream is the exhaust from a grain drier.

14. The method of claim 1 wherein said gas stream is an exhaust gas from the spray drying of milk.

15. The method of claim 14 wherein extrained milk particles in said exhaust gas are recovered as a relatively concentrated solution in the condensate stream produced by heat exchange.

16. The method of claim 1 wherein said gas stream is a flue gas produced by the burning of coal.

17. The method of claim 16 wherein said flue gas is at least partially humidified by mixing steam with said gas.

18. The method of claim 17 wherein said flue gas contains sulfur dioxide and wherein a sulfur dioxide-reactive chemical is introduced into said gas prior to subjecting it to heat exchange.

19. The method of claim 18 wherein said reactive chemical is selected from the group consisting of sodium hydroxide, sodium carbonate, milk of lime, ammonium hydroxide and mixtures thereof.

20. A method for removing finely divided particulate matter and gaseous contaminants from gas streams which comprises:

humidifying the gas stream with water;

introducing a chemical reactive with said gaseous contaminants into the gas stream; and thereafter subjecting the humidified gas stream to indirect contact heat exchange sufficient to lower the gas stream to a temperature below its dew point, thereby condensing water on the surfaces of said particulate matter, and to provide an energy transfer for condensation of water vapor in said gas stream of at least 5 hp per 1000 cfm, said heat exchange being accomplished by passing said humidified gas stream directly to and downwardly through a heat exchange element having smooth and essentially vertical gas passages of relatively large dimension thereby causing migration of said particulate matter from the gas stream to the surfaces of said heat exchange element;

separating condensed water, now containing particulate matter, from the gas stream, and recovering a gas stream substantially depleted of particulate matter.

21. The method of claim 20 wherein said gaseous contaminant is acidic and wherein said reactive chemical is basic.

22. The method of claim 21 wherein said acidic gaseous contaminant is sulfur dioxide and wherein said reactive chemical is selected from the group consisting of sodium hydroxide, sodium carbonate, milk of lime, ammonium hydroxide and mixtures thereof.

23. The method of claim 20 wherein said gaseous contaminant is odorous and wherein said reactive chemical is an oxidizing agent.

24. The method of claim 23 wherein said oxidizing agent is selected from the group consisting of sodium hypochlorite, hydrogen peroxide and mixtures thereof.

* * * * *